No. 863,409.
PATENTED AUG. 13, 1907.
O. E. LEIB & E. B. WITTE.
MEANS FOR PACKING VALVE RODS OR SHAFTS UNDER PRESSURE.
APPLICATION FILED DEC. 22, 1906.
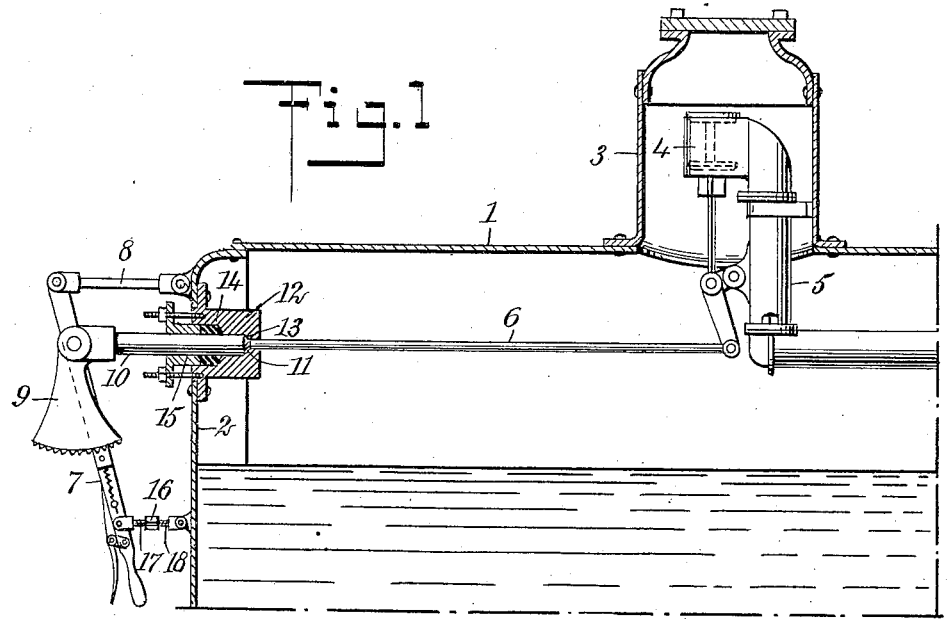
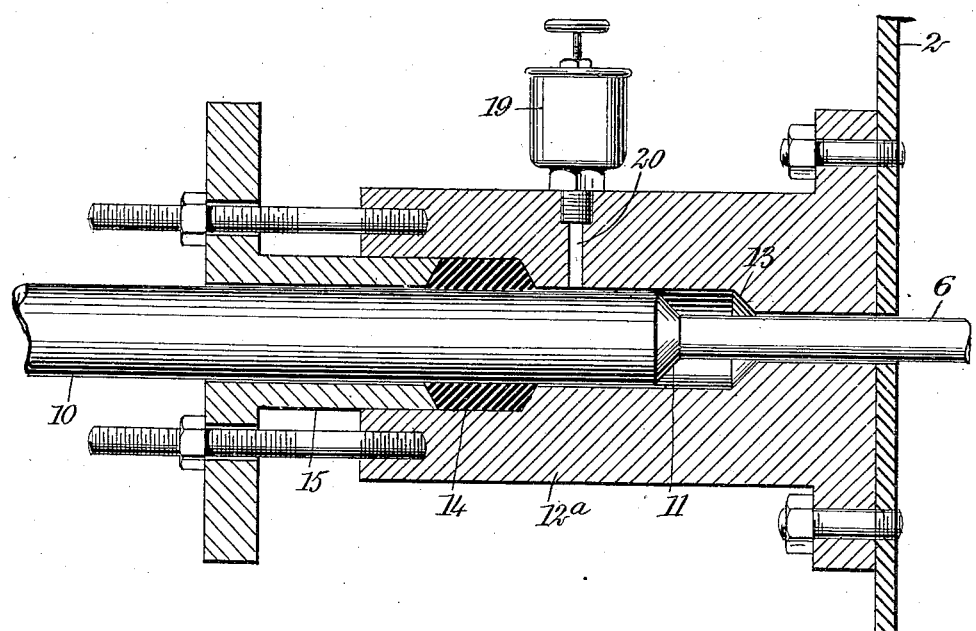
WITNESSES
INVENTORS
Oliver E. Leib
Eugene B. Witte
BY
ATTORNEYS

UNITED STATES PATENT OFFICE.

OLIVER E. LEIB AND EUGENE B. WITTE, OF TRENTON, NEW JERSEY.

MEANS FOR PACKING VALVE-RODS OR SHAFTS UNDER PRESSURE.

No. 863,409.  Specification of Letters Patent.  Patented Aug. 13, 1907.

Application filed December 22, 1906. Serial No. 349,079.

*To all whom it may concern:*

Be it known that we, OLIVER E. LEIB and EUGENE B. WITTE, both citizens of the United States, and residents of Trenton, in the county of Mercer and State of New Jersey, have invented a new and Improved Means for Packing Valve-Rods or Shafts Under Pressure, of which the following is a full, clear, and exact description.

This invention relates to new means whereby a fluid under pressure may be prevented from escaping past a valve rod, a shaft or other rotating or reciprocating member while the ordinary packing is being replaced or other parts being repaired.

The object of the invention is to so construct the valve rod and the bushing within which the packing is seated that by a longitudinal movement of the rod a tight joint may be effected entirely independent of the original packing, and this point firmly held until the original packing is readjusted or replaced.

In many arts a fluid under pressure, and often at very high temperature, as, for instance, steam, is confined in a closed space, and in order to operate a throttle valve or other similar device, it is necessary to pass a rod or shaft through a packing in the wall of the inclosing chamber. The packing often becomes worn out or ruined by the high temperature, or the flange of the bushing holding the packing in place becomes broken or in some other way the efficiency of the packing becomes impaired. It is impossible to repair the packing without withdrawing the steam or other fluid and permitting the parts to become cooled.

By means of our improved construction hereinafter described, the packing may be readily removed and replaced or any broken parts repaired without withdrawing the steam or interfering with the normal difference in pressure between the interior and exterior of the inclosing chamber.

This invention is particularly applicable for use in connection with throttle valve rods of steam engines, and it has been illustrated in this connection in the drawings, although it is evident that the same means may be employed in various other ways.

The invention consists in certain features of construction and combination of parts, all of which will be fully set forth hereinafter and particularly pointed out in the claims.

Reference is to be had to the accompanying drawings forming a part of this specification in which similar characters of reference indicate corresponding parts in both the figures, in which Figure 1 is a sectional view of a steam boiler, illustrating a throttle valve and its operating means and our improved packing for the throttle valve rod; and Fig. 2 is a longitudinal section through a modified form of packing.

In Fig. 1 there is illustrated a conventional form of boiler having a cylindrical body portion 1, a boiler head 2, and a dome 3 containing the throttle valve 4 therein. Leading from the throttle valve is the steam pipe 5, and the throttle valve is shown as being operated by a throttle valve rod 6 extending through a packing in the head 2 of the boiler. Pivoted to the outer end of the valve rod 6 is a lever 7 connected to the head of the boiler or to any other suitable stationary part by a link 8 pivoted at both ends. The throttle valve rod carries a segment 9 having its curved geared surface arranged concentric with the pivotal connection of the lever 7, to the throttle valve rod 6. The lever carries a suitable spring-pressed dog, whereby the valve rod may be held in any desired position and the throttle valve readily controlled.

The essential portion of our invention resides in the specific construction of the valve rod 6 and the packing in the head of the boiler. The valve rod 6 is of two different diameters, the smaller portion lying within the boiler and the larger portion 10 extending to the outside thereof. The two portions of the valve rod are connected by a beveled shoulder 11 lying within the packing box 12. This box is provided with a cylindrical portion adapted to receive the larger portion 10 of the valve rod, and a second cylindrical portion adapted to receive the portion of the valve rod 6 having the smaller diameter. Connecting the larger and smaller cylindrical passages of the packing box 12 is a beveled seat 13 similar in size and angle to the beveled shoulder 11 of the valve rod. The outer end of the packing box 12 is provided with an enlarged recess adapted to receive the packing 14, and a suitable flanged collar 15 of common construction is employed for controlling the pressure applied to the packing 14. The larger cylindrical portion within the packing box 12 is normally of greater length than the normal throw of the valve rod, so that during the normal operation of the device the shoulder 11 on the rod does not come into engagement with the packing
14. In the normal operation the valve rod is moved back and forth to open and close the valve, and the packing 14 effectually prevents the escape of steam past the valve rod.

In case the packing becomes burned, dried, or so hardened that it no longer properly fulfils its function and it becomes necessary to replace the packing, or in case the flanged collar 15 is broken, we merely push in the valve rod 6 until the shoulder 11 of the valve rod comes in contact with the seat 13 of the packing box and firmly holds these two in engagement with each other, whereby a firm and tight joint is effected and no steam can escape. The throttle lever 7 may then be locked in position by means of a turn-buckle 16 operating in connection with two bolts 17 and 18 pivotally connected to the head of the boiler and to the throttle lever. There is now no liability of the shoulder 11 of the valve rod and the shoulder 13 of the packing box becoming disengaged, and the flanged collar 15 may then be removed and the packing 14 taken out and replaced or any other suitable repairs be effected. The engagement of the spring-pressed dog of the throttle lever 7 with the teeth of the segment 9 is ordinarily sufficient to hold the throttle valve and valve rod in the desired position, but by means of the turn-buckle 16 the respective shoulders of the packing box and valve rod may be brought into much firmer engagement and much finer adjustment secured. The firm joint effected by the contacting of the two shoulders forms a steam-tight seal, and it is entirely immaterial how great the difference in pressure between the interior and the exterior of the inclosing chamber.

A slight modification is illustrated in Fig. 2 of the drawings. The packing box 12ª is illustrated as being secured to the exterior rather than to the interior of the boiler head 2. It is evident that this packing box may be secured to either side desired, but in case it is secured to the exterior, we preferably provide an oil cup 19 communicating with an oil duct 20 leading to the cylindrical passage of the packing box intermediate the shoulder 13 and the packing 14. By means of this oil cup the packing 14 may be lubricated and kept in far better condition than is ordinarily possible for the packing of throttle valve rods.

The improved construction above described is capable of very many different applications as above stated, but one special application to which we desire to refer is its use in connection with the drive shafts of the propellers on vessels. When the packing surrounding the drive shaft needs replacing, it is often necessary to place the vessel in dry dock, but by so constructing the drive shaft that it may be moved a slight distance longitudinally and by providing it and the packing box with corresponding shoulders, a firm joint may be effected, and the water prevented from entering the hold of the vessel while the packing ordinarily relied upon is being replaced.

Having thus described our invention, we claim as new and desire to secure by Letters Patent:

1. In combination, a packing box having a passage therethrough, a beveled shoulder within said passage, a valve rod extending through said packing box and having a shoulder adapted to engage with the shoulder of the packing box, a packing surrounding said valve rod, a turn-buckle for moving said valve rod longitudinally to bring the shoulders into engagement with each other, and means for locking the parts in position.

2. In combination, a packing box having a passage therethrough, one portion of said passage being of greater diameter than the remaining portion of the passage, a beveled shoulder connecting said portions, a cylindrical valve rod having portions adapted to fit the separate cylindrical portions of the packing box and having a beveled shoulder adapted to engage with the shoulder of the packing box surrounding said valve rod, and means for moving said valve rod longitudinally to bring the beveled shoulders in contact with each other and permit of the removal or repair of the packing.

3. In combination, a packing box having a passage therethrough, one portion of said passage being of greater diameter than the remaining portion of the passage, a shoulder connecting said portions, a cylindrical valve rod having portions adapted to fit the separate cylindrical portions of the packing box and having a shoulder adapted to engage with the shoulder of the packing box, a packing within said packing box and surrounding said valve rod, means for moving said valve rod longitudinally to bring the shoulders in contact with each other and permit of the removal or repairing of the packing, and means for lubricating said rod intermediate said packing and said shoulders.

In testimony whereof we have signed our names to this specification in the presence of two subscribing witnesses.

OLIVER E. LEIB.
EUGENE B. WITTE.

Witnesses:
CHAS. A. REID,
JAMES WOOLY.